(12) United States Patent
Voznesenskiy et al.

(10) Patent No.: US 10,012,491 B2
(45) Date of Patent: Jul. 3, 2018

(54) LARGE NUMERICAL APERTURE PHASE-SHIFTING DUAL PINHOLE DIFFRACTION INTERFEROMETER AND ITS TEST METHOD

(71) Applicants: CHANGCHUN INSTITUTE OF OPTICS, FINE MECHANICS AND PHYSICS, CHINESE ACADEMY OF SCIENCES, Changchun, Jilin (CN); VTT-NTM OÜ, Tartu (EE)

(72) Inventors: Nikolay Voznesenskiy, Tartu (EE); Dongmei Ma, Changchun (CN); Chunshui Jin, Changchun (CN); Haitao Zhang, Changchun (CN); Jie Yu, Changchun (CN); Mariia Voznesenskaia, Tartu (EE); Tatiana Voznesenskaia, Tartu (EE); Wenlong Zhang, Changchun (CN)

(73) Assignees: CHANGCHUN INSTITUTE OF OPTICS, FINE MECHANICS AND PHYSICS, CHINESE ACADEMY OF SCIENCES, Changchun, Jilin (CN); VTT-NTM OU, Tartu (EE)

( * ) Notice: Subject to any disclaimer, the term of this patent is extended or adjusted under 35 U.S.C. 154(b) by 0 days.

(21) Appl. No.: 15/310,025

(22) PCT Filed: Oct. 27, 2014

(86) PCT No.: PCT/CN2014/000951
§ 371 (c)(1),
(2) Date: Nov. 9, 2016

(87) PCT Pub. No.: WO2016/004550
PCT Pub. Date: Jan. 14, 2016

(65) Prior Publication Data
US 2017/0184391 A1    Jun. 29, 2017

(30) Foreign Application Priority Data
Jul. 4, 2014 (CN) .......................... 2014 1 0318139

(51) Int. Cl.
*G01B 9/02* (2006.01)
*G01B 11/02* (2006.01)
(Continued)

(52) U.S. Cl.
CPC ..... *G01B 9/02038* (2013.01); *G01B 9/02041* (2013.01); *G01B 9/02072* (2013.04);
(Continued)

(58) Field of Classification Search
CPC ............ G01B 9/02038; G01B 9/02041; G01B 9/02072; G01B 11/2441; G01M 11/005; G01M 11/0271
See application file for complete search history.

(56) References Cited

U.S. PATENT DOCUMENTS 5,835,217 A * 11/1998 Medecki .................. G01J 9/02
356/521
6,344,898 B1 * 2/2002 Gemma ............... G01B 11/255
356/513
(Continued)

FOREIGN PATENT DOCUMENTS

| CN | 102519358 A | 6/2012 |
| CN | 102564301 A | 7/2012 |
| CN | 103398655 A | 11/2013 |

OTHER PUBLICATIONS

International Search Report (PCT/ISA/210) issued in PCT/CN2014/000951, dated Mar. 16, 2015.

*Primary Examiner* — Michael A Lyons
(74) *Attorney, Agent, or Firm* — Birch, Stewart, Kolasch & Birch, LLP

(57) ABSTRACT

A diffraction interferometer includes a reference light passage, a test light passage and a pinhole substrate. The
(Continued)

pinhole substrate includes a test pinhole and a reference pinhole. The diffracted wavefront emitted from the test pinhole is reflected by the optical component to be tested adjacent to the pinhole substrate and a converge adjacent to the reference pinhole. The diffracted wavefront includes surface shape information of an optical component to be tested that is reflected by the pinhole substrate. Interference with the diffracted wavefront is emitted by the reference pinhole and forms interference fringes. The large numerical aperture phase-shifting dual pinhole diffraction interferometer adopts a dual pinhole substrate and a illumination manner with two converged light paths to enable the separation of the reference light and test light, to prevent disturbance between the two light paths, which would induce the change of interferogram status during phase-shifting.

2 Claims, 1 Drawing Sheet

(51) Int. Cl.
  *G01M 11/00* (2006.01)
  *G01M 11/02* (2006.01)
  *G01B 11/24* (2006.01)

(52) U.S. Cl.
  CPC ....... *G01B 11/2441* (2013.01); *G01M 11/005* (2013.01); *G01M 11/0271* (2013.01)

(56) References Cited

U.S. PATENT DOCUMENTS

| | | | |
|---|---|---|---|
| 6,573,997 B1 | 6/2003 | Goldberg et al. | |
| 6,804,009 B2* | 10/2004 | Rushford | G01B 11/065 356/492 |
| 7,084,983 B2 | 8/2006 | Hill | |
| 7,095,510 B2 | 8/2006 | Fukui | |
| 8,767,217 B2 | 7/2014 | Hajian et al. | |
| 2006/0192977 A1* | 8/2006 | Takata | G01M 11/0271 356/515 |
| 2010/0014098 A1* | 1/2010 | Suzuki | G01B 11/2441 356/512 |
| 2011/0249272 A1* | 10/2011 | Voznesenskaya | G01M 11/005 356/521 |
| 2012/0140242 A1* | 6/2012 | Feng | G01J 9/02 356/521 |

* cited by examiner

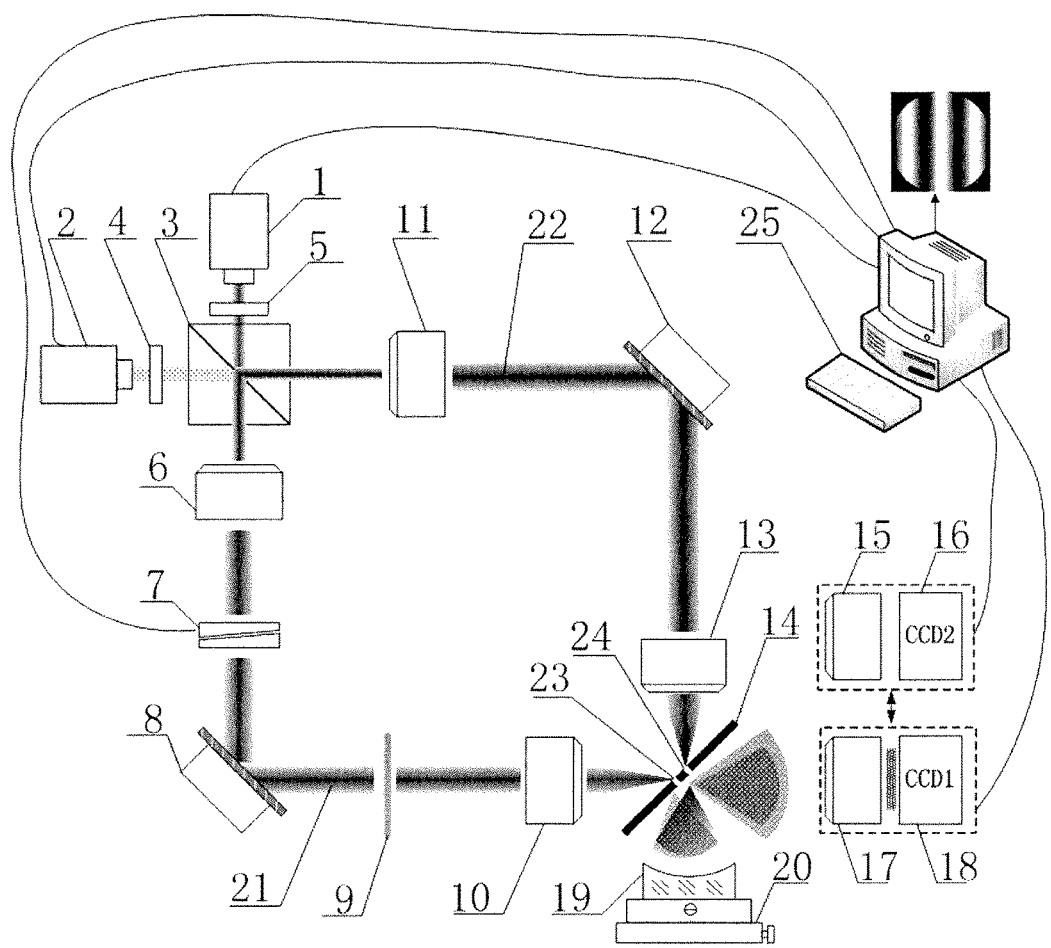

LARGE NUMERICAL APERTURE PHASE-SHIFTING DUAL PINHOLE DIFFRACTION INTERFEROMETER AND ITS TEST METHOD

TECHNICAL FIELD

The present invention relates to the technical field of point diffraction interferometer, and particularly relates to a large numerical aperture phase-shifting dual pinhole diffraction interferometer and its test method.

BACKGROUND

Due to the unique feature of interference wavefront reference generation technology, point diffraction interferometer become a metrology level optical wavefront test instrument, which is mainly applied in the calibration and measurement of commercial standard lens and in the development of high precision lithography lens.

Currently, there are two kinds of working mechanism of point diffraction interferometer: the first one is as follows: making a pinhole less than 1 micrometer on an optical substrate, which produces a high-precision spherical diffraction wavefront when the light path through said pinhole; using one portion of said wavefront as test light, and another portion as reference light, so that two portions of light interference after reflection and produce an interferogram; producing several different phases interferograms by moving the test mirror; then analyzing and obtaining the figure deviation between the tested mirror (or optical system) and the reference. The second one is, making use of diffraction of the light emitted from a optical fiber to produce reference spherical wavefront, and using short coherent light source to achieve the high precision test of the tested mirror.

For the first kind of point diffraction interferometer of above two mechanisms, since it divides diffraction wavefront into two portions, the testable angle is only a half of the angle of the wavefront diffracted by using the pinhole, and thus, the testable angle is limited, the maximum value is NA0.3. As a result of using a moving test mirror, interferometer cavity length changes, resulting in reduced test accuracy; and fringe contrast is not adjustable, resulting in low contrast and low test accuracy when testing uncoated mirrors.

The problem of the second kind of point diffraction interferometer is that the testable numerical aperture is small, that is because the production of small core diameter fiber is difficult, resulting in diffraction angle of the wavefront emitted from the optical fiber is small. Meanwhile, by using short coherent light source, there are restrictive requirement on the matching of the curvature radius of the test mirror, causing a cumbersome test process.

BRIEF SUMMARY

The purpose of the present invention is to solve the technical problems of prior art point diffraction interferometer, comprising limited testable angle, low test accuracy, nonadjustable fringe contrast, cumbersome test process, etc. The present invention provides a large numerical aperture phase-shifting dual pinhole diffraction interferometer and its test method, which can achieve a high precision test with large numerical aperture, without the disturbance between the test light and reference light.

To solve the above technical problems, the technical solution of the present invention is as follows:

A large numerical aperture phase-shifting dual pinhole diffraction interferometer, comprising:

reference light passage, test light passage and pinhole substrate; wherein, a test pinhole and a reference pinhole are provided on said pinhole substrate;

via said test light passage, light emitted by the laser source can sequentially approach test beam expanding system and test beam convergent system, then illuminate the test pinhole on the pinhole substrate;

via said reference light passage, light emitted by the laser source can sequentially approach reference beam expanding system, wedge phase-shifting mechanism and reference beam convergent system, then illuminate the reference pinhole on the pinhole substrate;

the diffracted wavefront emitted by the test pinhole would be reflected by an optical component to be tested near the pinhole substrate and converge near the reference pinhole, wherein, said diffracted wavefront contains surface figure information of the optical component to be tested, and would be reflected by the pinhole substrate and interference with the diffracted wavefront emitted by reference pinhole, forming the interference fringes;

interferogram can be obtained according to said interference fringes; multiple phase-shifting interferograms can be obtained by using wedge phase-shifting mechanism; high-precision surface shape deviation of the optical component to be tested can be obtained by analyzing said multiple phase-shifting interferograms.

In the above technical solution, the reference light passage is further provided with a light intensity attenuating mechanism, by adjusting said light intensity attenuating mechanism, the best contrast of interference fringes can be achieved.

In the above technical solution, said laser source comprising: work laser source and calibration laser source.

A test method by using the large numerical aperture phase-shifting dual pinhole diffraction interferometer, the large numerical aperture phase-shifting dual pinhole diffraction interferometer further comprises: calibration and observation optical imaging system, bright spot image optical acquisition system, small field interferogram optical imaging system, interferogram photo-electric acquisition system; orientation calibrating mechanism of the optical component to be tested for amounting the optical component to be tested; the laser sources comprise work laser source and calibration laser source, with a refraction-reflection-transmission splitting prism located at said laser sources including work laser source and calibration laser source;

the test method comprises the steps of:

i, turning on the power supply, so that the work laser source and calibration laser source begin to emit light and get stabilized;

ii, arranging the optical component to be tested close to the pinhole substrate;

iii, turning on the calibration laser source, so that the light emitted thereof enter the interferometer system after being reflected by refraction-reflection-transmission splitting prism;

iv, adjusting the calibration and observation optical imaging system and the bright spot image optical acquisition system to align with the reference light passage; adjusting the orientation calibrating mechanism of the optical component to be tested to change the position of the optical component to be tested, by observing the bright spot image of bright spot image optical acquisition system, so that the diffracted light emitted by the test pinhole is reflected by the optical component to be tested and the converging light point approach the pinhole substrate near the reference pinhole;

v, turning off the calibration laser source, then turn on the work laser source, so that the light emitted thereof enter the interferometer system after being reflected by refraction-reflection-transmission splitting prism, forming reference light in the reference light passage and test light in the test light passage in the meantime;

vi, removing the calibration and observation optical imaging system and bright spot image optical acquisition system out of the light path/passage, and align the small field interferogram optical imaging system and the interferogram photo-electric acquisition system with the reference light passage, so that the diffracted reference light emitted by the reference pinhole interferences with the test light which is reflected by the optical component to be tested and converge near the reference pinhole;

viii, controlling the cooperation of the wedge phase-shifting mechanism with the small field interferogram optical imaging system and interferogram photo-electric acquisition system, so that multiple phase-shifting interferograms are collected;

ix, using a phase-shifting interferogram processing software to achieve a precision test of the optical component to be tested.

In the above technical solution, after step vi and before step viii, it also features in the step of:

vii, adjust the light intensity attenuating mechanism on the reference light passage, to achieve the best contrast of the interference fringes.

The present invention has the following advantageous effects:

The large numerical aperture phase-shifting dual pinhole diffraction interferometer in the present invention adopts a dual pinhole substrate and a illuminating manner of two converged light paths, enabling the separation of reference light passage and test light passage, to prevent the disturbance between the two light paths, which would induce the change of interferogram status during phase-shifting. Since the small field interferogram optical imaging system merely align with the reference light passage to image, it can avoid the influence of the test light passage to the image, and achieve a large numerical aperture test in a phase-shifting manner. Meanwhile, it adopts multistep optical phase-shifting plate, and changes the thickness of the wedge phase-shifting plate within the reference light passage via the lateral movement of the wedge phase-shifting plate, thereby changing the optical path difference of the reference light passage and the test light passage, reducing the requirement for accuracy of phase-shifting mechanism. The present invention adopts 632.8 nm helium-neon laser source as work laser source, with long interference length, so it can achieve a large dynamic range test. The features of the present invention includes: high test accuracy, large test numerical aperture, and wide test range.

BRIEF DESCRIPTION OF THE DRAWINGS

These and other features and advantages of the various embodiments disclosed herein will be better understood with respect to the following description and drawings, in which:

The FIGURE illustrates the light path structure of large numerical aperture phase-shifting dual pinhole diffraction interferometer of the present invention.

The numbers in the FIGURE are as below:
1. work laser source;
2. calibration laser source;
3. refraction-reflection-transmission splitting prism;
4. calibration laser source shutter;
5. work laser source shutter;
6. reference beam expanding system;
7. wedge phase-shifting mechanism;
8. reference beam reflective mirror;
9. light intensity attenuating mechanism;
10. reference beam convergent system;
11. test beam expanding system;
12. test beam reflective mirror;
13. test beam convergent system;
14. pinhole substrate;
15. calibration and observation optical imaging system;
16. bright spot image optical acquisition system;
17. small field interferogram optical imaging system;
18. interferogram photo-electric acquisition system;
19. optical component to be tested;
20. orientation calibration mechanism of the optical component to be tested;
21. reference light passage (path);
22. test light passage (path);
23. reference pinhole;
24. test pinhole;
25. computer.

DETAILED DESCRIPTION

The inventive principle of the invention is:

The large numerical aperture phase-shifting dual pinhole diffraction interferometer of present invention adopts a dual pinhole substrate and an illuminating manner of two converged light paths, enabling the separation of reference light passage and test light passage, to prevent the disturbance between the two light paths, which would induce the change of interferogram status during phase-shifting. The small field interferogram optical imaging system is merely aligned with the reference light path/passage to image, so it can avoid the influence of the test light passage to the image, and achieve a large numerical aperture test in a phase-shifting manner. Meanwhile, it adopts multistep optical phase-shifting plate, and changes the thickness of the optical phase-shifting plate within the reference light passage via the lateral movement of the wedge phase-shifting plate, thereby changing the optical path difference between the reference light and the test light, reducing the requirement for accuracy of phase-shifting mechanism. The present invention adopts 632.8 nm helium-neon laser source as work laser source, with long interference length, so it can achieve a large dynamic range test. The features of the present invention includes: high test accuracy, large test numerical aperture, and wide test range.

The large numerical aperture phase-shifting dual pinhole diffraction interferometer of the present invention comprises calibration and observation optical system, so as to adjusting the position of the optical component to be tested quickly and easily, so that the converging light point of the test light can easily return and align with the pinhole substrate. For now the development of the test device of the present invention has been completed, and the device has a small size, wherein, the device can be used no matter the axis is in horizontal state or in vertical state, and can achieve the ultra-high-precision test of the tested mirror in its working state.

Below, with reference to the drawing, the present invention will be described in detail.

As the FIGURE illustrates, the large numerical aperture phase-shifting dual pinhole diffraction interferometer comprises: a reference light passage 21, a test light passage 22, a pinhole substrate 14; a calibration and observation optical imaging system 15, a bright spot image optical acquisition system 16, a small field interferogram optical imaging system 17, an interferogram photo-electric acquisition system 18; an orientation calibrating mechanism 20 of optical component to be tested for calibrating optical component to be tested 19; laser sources including work laser source 1 and calibration laser source 2. Said work laser source 1 is a high-stability laser source, and suitable for long-time stably working; said calibration laser source 2 is a high-power laser source, suitable for light path calibrating and testing.

There is a refraction-reflection-transmission splitting prism 3 located at said laser source, which includes work laser source 1 and calibration laser source 2. A test pinhole 24 and a reference pinhole 23 are arranged on/in said pinhole substrate 14.

Via said test light passage 22, light emitted by the laser sources can sequentially approach the test beam expanding system 11 and test beam convergent system 13, then reach the test pinhole 24 on the pinhole substrate 14.

Via said reference light passage 21, light emitted by the laser source can sequentially approach the reference beam expanding system 6, the wedge phase-shifting mechanism 7 and the reference laser convergent system 10, then reach the reference pinhole 23 on the pinhole substrate 14. Multiple phase-shifting interferograms can be obtained by controlling the position of wedge phase-shifting mechanism 7.

The diffracted wavefront emitted at the test pinhole 24 would be reflected by the optical component to be tested 19 near pinhole substrate 14 and converge near the reference pinhole 23. Said diffracted wavefront would comprise surface shape information of the optical component to be tested 19, be reflected by pinhole substrate 14 and interfere with the diffracted wavefront emitted by the reference pinhole 23, thereby forming interference fringes. Said reference light passage 21 is further provided with a light intensity attenuating mechanism 9, by adjusting said light intensity attenuating mechanism 9, the best contrast of interference fringes can be achieved.

In the working process of the large numerical aperture phase-shifting dual pinhole diffraction interferometer of the present invention, it makes use of the light from work laser source 1, which is transmitted and reflected by the refraction-reflection-transmission splitting prism 3, to provide the light for the reference light passage 21 and test light passage 22 respectively. The light of the two light paths pass through reference beam expanding system 6, wedge phase-shifting mechanism 7, reference beam reflective mirror 8, light intensity attenuating mechanism 9, reference beam convergent system 10, test beam expanding system 11, test beam reflective mirror 12, test beam convergent system 13 sequentially, and then converge and align with the reference pinhole 23 and test pinhole 24 on the pinhole substrate 14 respectively, and diffracted.

The diffracted wavefront emitted by the reference pinhole 23 is used as reference wavefront for the test; the diffracted wavefront emitted by the test pinhole 24 would be reflected by the optical component to be tested 19 and converge near the reference pinhole 23, wherein said diffracted wavefront would comprise surface figure information of the optical component to be tested 19, be reflected by pinhole substrate 14 and interference with the diffracted wavefront emitted by reference pinhole 23, forming the interference fringes. Then, the small field interferogram optical imaging system 17 and interferogram photo-electric acquisition system 18 are used to get interference images; the light intensity attenuating mechanism 9 is used to adjust the contrast of the interference fringes; the wedge phase-shifting mechanism 7 is used to collect multiple phase-shifting interferograms; the high-precision surface figure deviation of optical component to be tested 19 is obtained by analyzing the information of said interferograms.

The test method of the present invention by using large numerical aperture phase-shifting dual pinhole diffraction interferometer comprises the steps of:

Step 1, turning on the mainframe power switch of phase-shifting point diffraction interferometer, so that the work laser source 1 and calibration laser source 2 begin to emit light and get stabilized, respectively;

Step 2, arranging the optical component to be tested 19 on the orientation calibrating mechanism 20 for the optical component to be tested;

Step 3, under the control of the computer 25, turning on the calibration laser source shutter 4, so that the light emitted by calibration laser source 2 enters the interferometer system after being reflected by the refraction-reflection-transmission splitting prism 3;

Step 4, using the computer 25 to control the servo motors, so as to make the calibration and observation optical imaging system 15 and the bright spot image optical acquisition system 16 aligned with the reference light passage 21, adjusting the orientation calibrating mechanism 20 of the optical component to be tested by observing the bright spot image of the bright spot image optical acquisition system 16, inducing the optical component to be tested 19 changes its position, so that for the diffracted light emitted by the test pinhole 24, after it is reflected by the optical component to be tested 19, its converging light point will illuminate on the pinhole substrate 14 near the reference pinhole 23;

Step 5, under the control of the computer 25, turning off the calibration laser source shutter 4, and turning on the work laser source shutter 5, so that the light emitted by the work laser source 1 enter the interferometer system via the refraction-reflection-transmission splitting prism 3, thereby forming reference light in the reference light passage 21 and test light in the test light passage 22 in the meantime;

Step 6, under the control of the computer 25, removing the calibration and observation optical imaging system 15 and the bright spot image optical acquisition system 16 out of the light path, and makes the small field interferogram optical imaging system 17 and interferogram photo-electric acquisition system 18 aligned with the reference light passage 21, so that the diffracted reference light from the reference pinhole 23 is interference with the test light which is reflected by the optical component to be tested 19 and converge near the reference pinhole 23;

Via the small field interferogram optical imaging system 17 and interferogram photo-electric acquisition system 18, one can observe interference fringes. Via the orientation calibration mechanism 20 of the optical component to be tested, the position of the optical component to be tested 19 is refined/fine-tuned, so that one can observe interference fringes image meeting the requirements of gathering (with the number of interference fringes as few as possible) via interferogram photo-electric acquisition system 18 on the computer 25.

Step 7, adjusting the light intensity attenuating mechanism 9, to get the best contrast of the interference fringes.

Step 8, using computer 25 to control the cooperation of the wedge phase-shifting mechanism 7 with the small field interferogram optical imaging system 17 and interferogram photovoltaic collection system 18, so that multiple phase-shifting interferograms are collected;

Step 9, using a phase-shifting interferogram processing software to achieve the high precision test of the optical component to be tested 19.

Obviously, the above description is given by way of example, rather than limitation. Given the above disclosure, one skilled in the art could implement its variations that are within the scope and spirit of the invention disclosed herein. Herein, there is no need and impossible to provide all of the implementations or embodiments. Further, the various features of the embodiments disclosed herein can be used alone, or in varying combinations with each other and are not intend to be limited to the specific combination described herein. Thus, the scope of the claims is nor to be limited by the illustrated embodiments.

What is claimed is:

1. A large numerical aperture phase-shifting dual pinhole diffraction interferometer, comprising:
    a laser source, a splitting prism, a first expanding lens, a first reflective mirror, a first convergent lens, a second expanding lens, a wedge mechanism for shifting phase of light, a second reflective mirror, a second convergent lens and a substrate, said substrate includes a first pinhole and a second pinhole,
    wherein light emitted by the first laser source is split into a first beam and a second beam by the splitting prism,
    wherein the first beam sequentially passes through the first expanding lens, the first reflective mirror and the first convergent lens, and illuminates the first pinhole on the substrate,
    wherein the second beam sequentially passes through the second expanding lens, the wedge mechanism for shifting phase of light, the second reflective mirror and the second convergent lens, and illuminates the second pinhole on the substrate,
    wherein a first diffracted light is emitted from the first pinhole and reflected by an optical component to be tested adjacent to the first pinhole, and then the first diffracted light converges adjacent to the second pinhole of the substrate and is reflected by the substrate, said first diffracted light containing surface figure information of the optical component to be tested,
    wherein a second diffracted light is emitted from the second pinhole, and the first diffracted light reflected by the substrate interferes with the second diffracted light emitted by the second pinhole, forming interference fringes,
    wherein an interferogram is obtained according to said interference fringes,
    wherein multiple interferograms with different phase-shifting are obtained by adjusting the wedge mechanism, and
    wherein surface figure deviations of the optical component to be tested are obtained by analyzing said multiple interferograms.

2. The large numerical aperture phase-shifting dual pinhole diffraction interferometer according to claim 1, further comprising an attenuating mechanism for light intensity,
    wherein, by adjusting said attenuating mechanism, a contrast of the interference fringes is achieved.

* * * * *